United States Patent
Ghaderi

(10) Patent No.: US 10,862,418 B2
(45) Date of Patent: Dec. 8, 2020

(54) POWER CONVERSION DEVICE, MOTOR DRIVE UNIT, AND ELECTRIC POWER STEERING DEVICE

(71) Applicant: Nidec Corporation, Kyoto (JP)

(72) Inventor: Ahmad Ghaderi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/485,210

(22) PCT Filed: Jan. 10, 2018

(86) PCT No.: PCT/JP2018/000251
§ 371 (c)(1),
(2) Date: Aug. 12, 2019

(87) PCT Pub. No.: WO2018/163591
PCT Pub. Date: Sep. 13, 2018

(65) Prior Publication Data
US 2019/0393823 A1  Dec. 26, 2019

(30) Foreign Application Priority Data
Mar. 8, 2017  (JP) ................ 2017-043630

(51) Int. Cl.
*H02P 1/28*  (2006.01)
*H02P 7/14*  (2006.01)
(Continued)

(52) U.S. Cl.
CPC ........... *H02P 27/08* (2013.01); *B62D 5/0463* (2013.01); *H02M 7/53871* (2013.01);
(Continued)

(58) Field of Classification Search
CPC ................. H02M 7/5387; H02M 7/08
(Continued)

(56) References Cited

U.S. PATENT DOCUMENTS 9,359,004 B2   6/2016  Kawata et al.
9,889,880 B2   2/2018  Mori
(Continued)

FOREIGN PATENT DOCUMENTS

JP  2008-132919 A   6/2008
JP  2014-201199 A   10/2014
JP  2015-189442 A   11/2015

OTHER PUBLICATIONS

Official Communication issued in International Patent Application No. PCT/JP2018/000251, dated Apr. 17, 2018.
(Continued)

*Primary Examiner* — Erick D Glass
(74) *Attorney, Agent, or Firm* — Keating & Bennett

(57) ABSTRACT

A power conversion device includes first and second inverters connectable to at least one of first and second coil groups, a first separation relay circuit connected to the first inverter, a second separation relay circuit connected to the second inverter, a third separation relay circuit connected between the first separation relay circuit and the first coil group, a fourth separation relay circuit connected between the second separation relay circuit and the second coil group, and n connection lines to, for each phase, connect n nodes between the first and third separation relay circuits and n nodes between the second and fourth separation relay circuits, where n is an integer of 3 or more.

19 Claims, 14 Drawing Sheets

(51) Int. Cl.
    *H02P 23/00*     (2016.01)
    *H02P 27/08*     (2006.01)
    *B62D 5/04*     (2006.01)
    *H02M 7/5387*     (2007.01)
    *H02P 25/18*     (2006.01)
    *H02P 25/22*     (2006.01)

(52) U.S. Cl.
    CPC .............. *H02P 25/18* (2013.01); *H02P 25/22* (2013.01); *B62D 5/0409* (2013.01)

(58) Field of Classification Search
    USPC ........................................................ 318/504
    See application file for complete search history.

(56) References Cited

U.S. PATENT DOCUMENTS

| 10,218,302 B2 | 2/2019 | Koseki et al. |
|---|---|---|
| 2016/0036371 A1 | 2/2016 | Yamasaki |

OTHER PUBLICATIONS

Basler et al., "Fault-Tolerant Strategies for Electronic Power Steering Systems under Functional Safety Requirements", URL:https://www.researchgate.net/publication/271318741, Dec. 2014, retrieval date Jun. 25, 2015, 7 pages.

Lawson et al., "Fault Tolerant Control for an Electric Power Steering System", 17th IEEE International Conference on Control Applications Part of 2008 IEEE Multi-conference on Systems and Control, ThA02.3, Sep. 3-5, 2008, pp. 486-491.

Ji et al., "Reliability improvement of electric power steering system based on ISO 26262", 2013 International Conference on Quality, Reliability, Risk, Maintenance, and Safety Engineering, Jul. 15-18, 2013, 6 pages.

POWER CONVERSION DEVICE, MOTOR DRIVE UNIT, AND ELECTRIC POWER STEERING DEVICE

CROSS REFERENCE TO RELATED APPLICATIONS

This is the U.S. national stage of application No. PCT/JP2018/000251, filed on Jan. 10, 2018, and priority under 35 U.S.C. § 119(a) and 35 U.S.C. § 365(b) is claimed from Japanese Application No. 2017-043630, filed Mar. 8, 2017; the entire contents of which are incorporated herein by reference.

1. FIELD OF THE INVENTION

The present disclosure relates to a power conversion device, a motor drive unit, and an electric power steering device.

2. BACKGROUND

In recent years, a mechanically and electrically integrated motor in which an electric motor (hereinafter simply referred to as "motor"), a power conversion device, and an electronic control unit (ECU) are integrated has been developed. Particularly, in the in-vehicle field, high quality assurance is required from the viewpoint of safety. For that reason, a redundant design has been adopted in which a safe operation can be continued even in the case in which a part of a component fails. As an example of redundant design, providing two power conversion devices for a single motor has been taken into consideration. As another example, providing a backup microcontroller in a main microcontroller has been taken into consideration.

In a motor drive device including a first system and a second system as a related art, the first system is connected to a first winding set of a motor and includes a first inverter part, a power supply relay, a reverse connection protection relay, and the like. The second system is connected to a second winding set of the motor and includes a second inverter part, a power supply relay, a reverse connection protection relay, and the like. When the motor drive device has not failed, it is possible to drive the motor using both the first system and the second system. On the other hand, when a failure occurs in one of the first system and the second system, or one of the first winding set and the second winding set, the power supply relay cuts off the power supply from the power supply to the failed system or the system connected to the failed winding set. It is possible to continue driving the motor using the other system that has not failed.

In a motor drive device including a first system and a second system as a related art, even when one system or one winding set has failed, it is possible to continue driving a motor through a system that has not failed.

SUMMARY

In the above-described related art, further improvement of motor driving at an abnormal time is in demand. For example, in the motor drive device of the related art, in a case in which one system has failed, a winding set which has not failed that is connected to the failed system also is not involved in motor driving together with the failed system. Appropriate motor driving according to a failure pattern is desired.

A power conversion device according to an example embodiment of the present disclosure is a power conversion device that converts power from a power supply to power supplied to an n-phase (n is an integer of 3 or more) motor including a first coil group and a second coil group, the power conversion device including a first inverter connectable to at least one of the first and second coil groups, a second inverter connectable to at least one of the first and second coil groups, a first separation relay circuit connected to the first inverter to, for each phase, switch between connection and disconnection between the first inverter and the first and second coil groups, a second separation relay circuit connected to the second inverter to, for each phase, switch between connection and disconnection between the second inverter and the first and second coil groups, a third separation relay circuit connected between the first separation relay circuit and the first coil group to, for each phase, switch between connection and disconnection between the first and second inverters and the first coil group, a fourth separation relay circuit connected between the second separation relay circuit and the second coil group to, for each phase, switch between connection and disconnection between the first and second inverters and the second coil group, and n connection lines to, for each phase, connect n nodes between the first and third separation relay circuits and n nodes between the second and fourth separation relay circuits.

The above and other elements, features, steps, characteristics and advantages of the present disclosure will become more apparent from the following detailed description of the example embodiments with reference to the attached drawings.

DETAILED DESCRIPTION

Hereinafter, example embodiments of a power conversion device, a motor drive unit, and an electric power steering device of the present disclosure will be described in detail with reference to the accompanying drawings. However, description that is more detailed than necessary may be omitted in some cases in order to avoid unnecessary redundancy and to facilitate understanding for those of ordinary skill in the art. For example, detailed description of already well-known matters or redundant description of substantially the same configuration may be omitted in some cases.

In the present specification, example embodiments of the present disclosure will be described by taking a power conversion device which converts power from a power supply to power supplied to a three-phase motor including three-phase (U-phase, V-phase, W-phase) windings as an example. However, a power conversion device which converts power from a power supply to power supplied to an n-phase motor including windings of n phases (n is an integer of 4 or more) such as four phases or five phases is also within the scope of the present disclosure.

Figure 1:
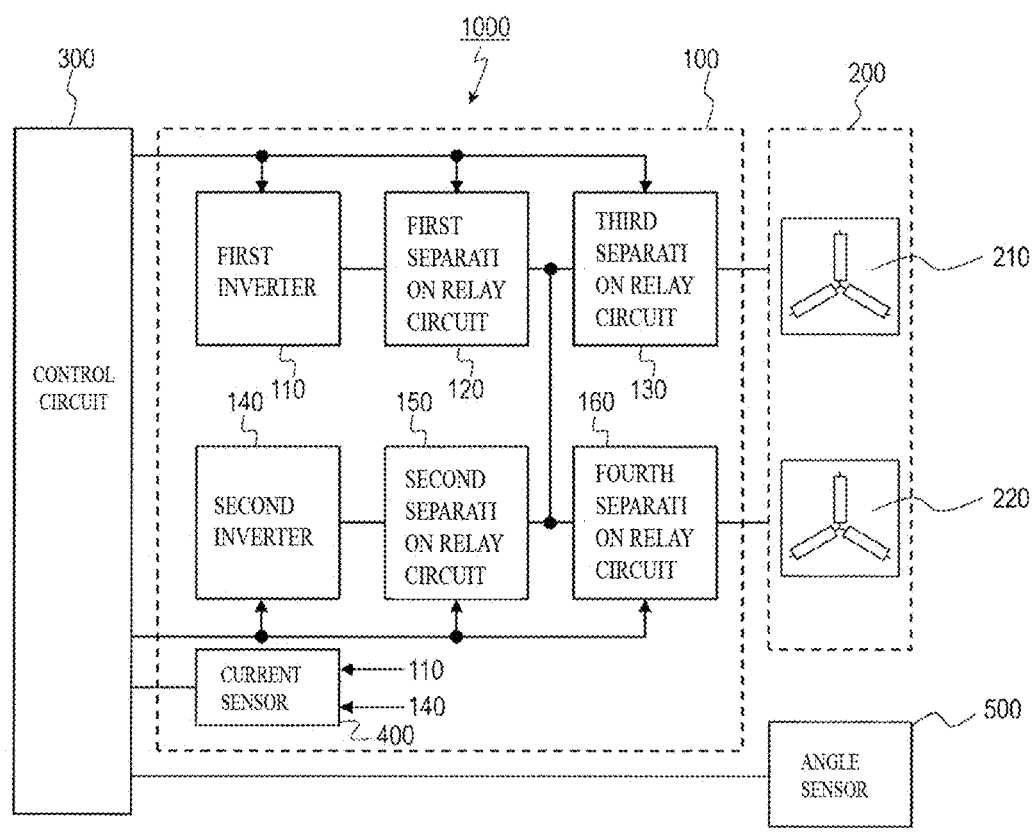
FIG. 1 is a block diagram illustrating a typical block configuration of a motor drive unit 1000 according to a first example embodiment of the present disclosure.

FIG. 1 schematically illustrates a typical block configuration of a motor drive unit 1000 according to the present example embodiment.

The motor drive unit 1000 typically includes a power conversion device 100, a motor 200, a control circuit 300, and an angle sensor 500. The angle sensor 500 is unnecessary in some cases according to a motor control method (e.g., sensorless control).

The motor drive unit 1000 may be modularized and may be manufactured and sold as, for example, a motor module including a motor, a sensor, a driver, and a controller. In the present specification, the motor drive unit 1000 will be described by taking a system including the motor 200 as an element as an example. However, the motor drive unit 1000 may also be a system for driving the motor 200 without the motor 200 as an element.

The power conversion device 100 includes a first inverter 110, a first separation relay circuit 120, a third separation relay circuit 130, a second inverter 140, a second separation relay circuit 150, a fourth separation relay circuit 160, and a current sensor 400. The power conversion device 100 can convert power from a power supply 101 to power supplied to the motor 200. For example, the first and second inverters 110 and 140 can convert direct current (DC) power to three-phase alternating current (AC) power, which is a pseudo sine wave of U-phase, V-phase, and W-phase.

The first inverter 110 is connectable to at least one of a first coil group 210 and a second coil group 220, and the second inverter 140 is connectable to at least one of the first coil group 210 and the second coil group 220. In the present specification, "connection" between components (elements) mainly means electrical connection.

The motor 200 is, for example, a three-phase AC motor. The motor 200 includes the first coil group 210 and the second coil group 220. Each of the first coil group 210 and the second coil group 220 includes U-phase, V-phase, and W-phase windings. In each coil group, connection of coils is, for example, a star connection or a delta connection.

The control circuit 300 is configured of a microcontroller or the like. The control circuit 300 controls the power conversion device 100 on the basis of an input signal from the current sensor 400 and the angle sensor 500. Examples of the control method include vector control, pulse width modulation (PWM), and direct torque control (DTC).

The angle sensor 500 is, for example, a resolver or a Hall integrated circuit (IC). The angle sensor 500 may also be implemented by a combination of a magnetic resistance (MR) sensor including an MR element and a sensor magnet. The angle sensor 500 detects an angle of rotation (hereinafter referred to as "rotation signal") of a rotor of the motor 200 and outputs the rotation signal to the control circuit 300.

A specific circuit configuration of the power conversion device 100 will be described with reference to FIG. 2.

Figure 2:
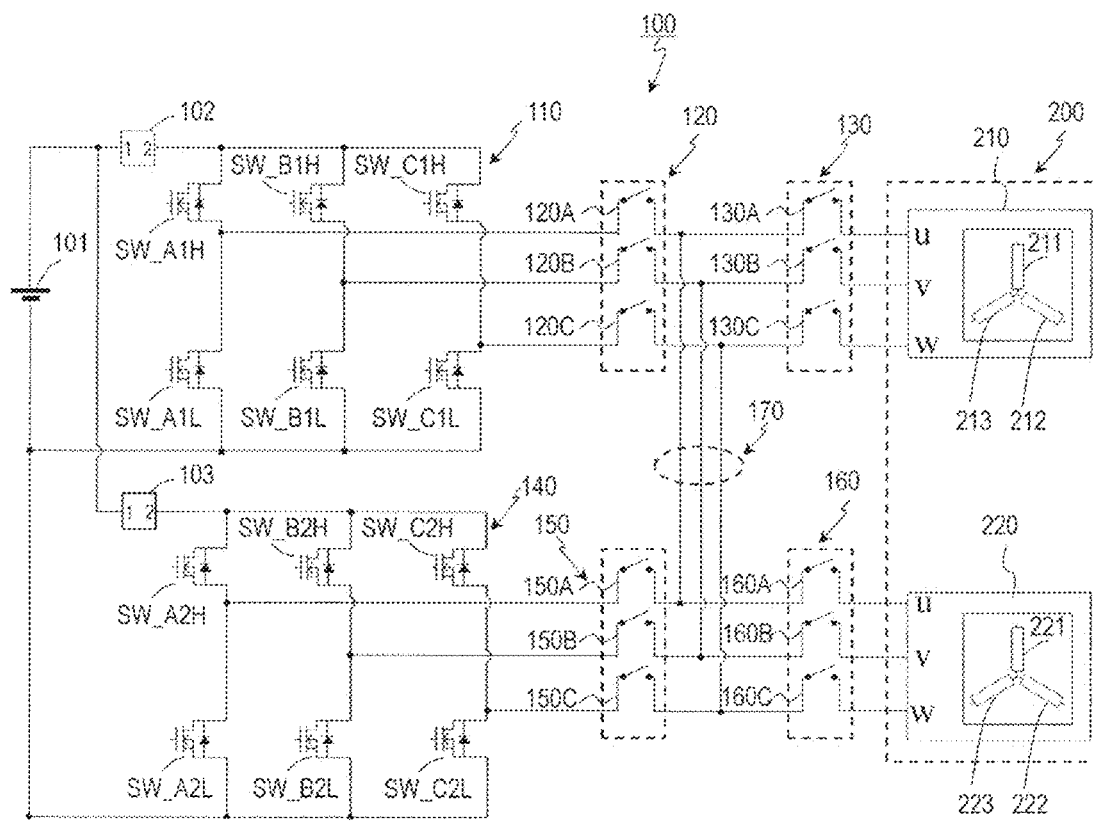
FIG. 2 is a circuit diagram illustrating a typical circuit configuration of a power conversion device 100 according to the first example embodiment of the present disclosure.

FIG. 2 schematically illustrates a typical circuit configuration of the power conversion device 100 according to the present example embodiment.

The power supply 101 generates a predetermined source voltage. As the power supply 101, for example, a DC power supply is used. However, the power supply 101 may also be an AC-DC converter, a DC-DC converter, or a battery (storage battery). The power supply 101 may be a single power supply common to the first and second inverters 110 and 140 or may include a first power supply for the first inverter 110 and a second power supply for the second inverter 140.

A first fuse 102 is connected between the power supply 101 and the first inverter 110. The first fuse 102 can interrupt a large current that can flow from the power supply 101 to the first inverter 110. A second fuse 103 is connected between the power supply 101 and the second inverter 140. The second fuse 103 can interrupt a large current that can flow from the power supply 101 to the second inverter 140. A relay or the like may be used instead of a fuse.

Although not illustrated, a coil is provided between the power supply 101 and the power conversion device 100. The coil functions as a noise filter and smoothes high frequency noise included in a waveform of voltage supplied to each inverter or high frequency noise generated in each inverter so that the high frequency noise does not flow out to the power supply 101 side. Also, a condenser is connected to a power supply terminal of each inverter. The condenser is a so-called bypass condenser, which suppresses voltage ripple. The condenser is, for example, an electrolytic condenser, and the capacity and number of condensers used are appropriately determined according to design specifications and the like.

The first inverter 110 includes a bridge circuit formed of three legs. Each leg includes a low side switching element and a high side switching element. The U-phase leg includes a high side switching element SW_A1H and a low side switching element SW_A1L. The V-phase leg includes a high side switching element SW_B1H and a low side switching element SW_B1L. The W-phase leg includes a high side switching element SW_C1H and a low side switching element SW_C1L. As the switching element, for example, a field-effect transistor (typically, a metal-oxide semiconductor field-effect transistor (MOSFET)) or an insulated gate bipolar transistor (IGBT) may be used.

The first inverter 110 includes, in each leg, a shunt resistor (not illustrated) as, for example, the current sensor 400 (see FIG. 1) for detecting current flowing through each of the U-phase, V-phase, and W-phase windings. The current sensor 400 includes a current detection circuit (not illustrated) that detects current flowing through each shunt resistor. For example, the shunt resistor may be connected between the low side switching element and the ground in each leg. A resistance value of the shunt resistor is, for example, about 0.5 mΩ to 1.0 mΩ.

The number of shunt resistors is not limited to three. For example, it is possible to use two shunt resistors for the U-phase and V-phase, two shunt resistors for the V-phase and W-phase, and two resistors for the U-phase and W-phase. The number of shunt resistors used and the arrangement of the shunt resistors are appropriately determined in consideration of product cost, design specifications, or the like.

The second inverter 140 includes a bridge circuit formed of three legs. The U-phase leg includes a high side switching element SW_A2H and a low side switching element SW_A2L. The V-phase leg includes a high side switching element SW_B2H and a low side switching element SW_B2L. The W-phase leg includes a high side switching element SW_C2H and a low side switching element SW_C2L. Like the first inverter 140, the second inverter 140 includes, for example, a shunt resistor in each leg.

The first separation relay circuit 120 may be connected to the first inverter 110 and is able to, for each phase, switch between connection and disconnection between the first inverter 110 and the first coil group 210 and the second coil group 220. The first separation relay circuit 120 includes three first separation relays that, for each phase, switch between connection and disconnection between the first inverter 110 and the first coil group 210 and the second coil group 220. Specifically, the first separation relay circuit 120 includes a U-phase first separation relay 120A, a V-phase first separation relay 120B, and a W-phase first separation relay 120C.

The first separation relay 120A is connected to the U-phase leg (a node between the high side switching element and the low side switching element) of the first inverter 110. The first separation relay 120B is connected to the V-phase leg of the first inverter 110. The first separation relay 120C is connected to the W-phase leg of the first inverter 110. As the separation relay, a semiconductor switch such as a MOSFET or an IGBT may be used. Other semiconductor switches, such as an analog switch IC, or mechanical relays may also be used.

The second separation relay circuit 150 may be connected to the second inverter 140 and is able to, for each phase, switch between connection and disconnection between the second inverter 140 and the first coil group 210 and the second coil group 220. The second separation relay circuit 150 includes three second separation relays that, for each phase, switch between connection and disconnection between the second inverter 140 and the first coil group 210 and the second coil group 220. Specifically, the second separation relay circuit 150 includes a U-phase second separation relay 150A, a V-phase second separation relay 150B, and a W-phase second separation relay 150C.

The second separation relay 150A is connected to the U-phase leg of the second inverter 140. The second separation relay 150B is connected to the V-phase leg of the second inverter 140. The second separation relay 150C is connected to the W-phase leg of the second inverter 140.

The third separation relay circuit 130 may be connected between the first separation relay circuit 120 and the first coil group 210 and is able to, for each phase, switch between connection and disconnection between the first inverter 110 and the second inverter 140 and the first coil group 210. The third separation relay circuit 130 includes three third separation relays that, for each phase, switch between connection and disconnection between the first inverter 110 and the second inverter 140 and the first coil group 210. Specifically, the third separation relay circuit 130 includes a U-phase third separation relay 130A, a V-phase third separation relay 130B, and a W-phase third separation relay 130C.

The third separation relay 130A is connected to the first separation relay 120A and a U-phase winding 211 in the first coil group 210. The third separation relay 130B is connected to the first separation relay 120B and a V-phase winding 212 in the first coil group 210. The third separation relay 130C is connected to the first separation relay 120C and a W-phase winding 213 in the first coil group 210.

The fourth separation relay circuit 160 may be connected between the second separation relay circuit 150 and the second coil group 220 and is able to, for each phase, switch between connection and disconnection between the first inverter 110 and the second inverter 140 and the second coil group 220. The fourth separation relay circuit 160 includes three fourth separation relays that, for each phase, switch between connection and disconnection between the first inverter 110 and the second inverter 140 and the second coil group 220. Specifically, the fourth separation relay circuit 160 includes a U-phase fourth separation relay 160A, a V-phase fourth separation relay 160B, and a W-phase fourth separation relay 160C.

The fourth separation relay 160A is connected to the second separation relay 150A and a U-phase winding 221 in the second coil group 220. The fourth separation relay 160B is connected to the second separation relay 150B and a V-phase winding 222 in the second coil group 220. The fourth separation relay 160C is connected to the second separation relay 150C and a W-phase winding 223 in the first coil group 220.

Three connection lines 170 connect, for each phase, three nodes between the first and third separation relay circuits 120 and 130 and three nodes between the second and fourth separation relay circuits 150 and 160. Specifically, a node between the first separation relay 120A and the third separation relay 130A and a node between the second separation relay 150A and the fourth separation relay 160A are connected by the U-phase connection line 170. A node between the first separation relay 120B and the third separation relay 130B and a node between the second separation relay 150B and the fourth separation relay 160B are connected by the V-phase connection line 170. A node between the first separation relay 120C and the third separation relay 130C and a node between the second separation relay 150C and the fourth separation relay 160C are connected by the W-phase connection line 170.

Figure 3A:
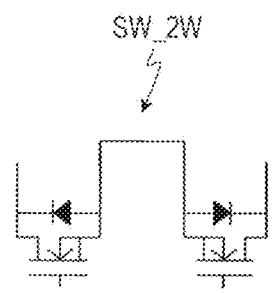
FIG. 3A is a schematic diagram illustrating a configuration of a bidirectional switch SW_2W.
Figure 3B:
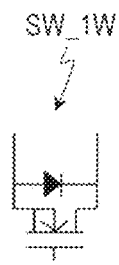
FIG. 3B is a schematic diagram illustrating a configuration of a unidirectional switch SW_1W.

FIG. 3A schematically illustrates a configuration of a bidirectional switch SW_2W. FIG. 3B schematically illustrates a configuration of a unidirectional switch SW_1W.

For example, as the three first separation relays 120A, 120B, and 120C and the three second separation relays 150A, 150B, and 150C, the bidirectional switch illustrated in FIG. 3A may be used. For example, as the three third separation relays 130A, 130B, and 130C and the three fourth separation relays 160A, 160B, and 160C, the unidirectional switch illustrated in FIG. 3B may be used. All of the separation relays of the first separation relay circuit 120, the second separation relay circuit 150, the third separation relay circuit 130, and the fourth separation relay circuit 160 may be bidirectional switches.

Figure 4:
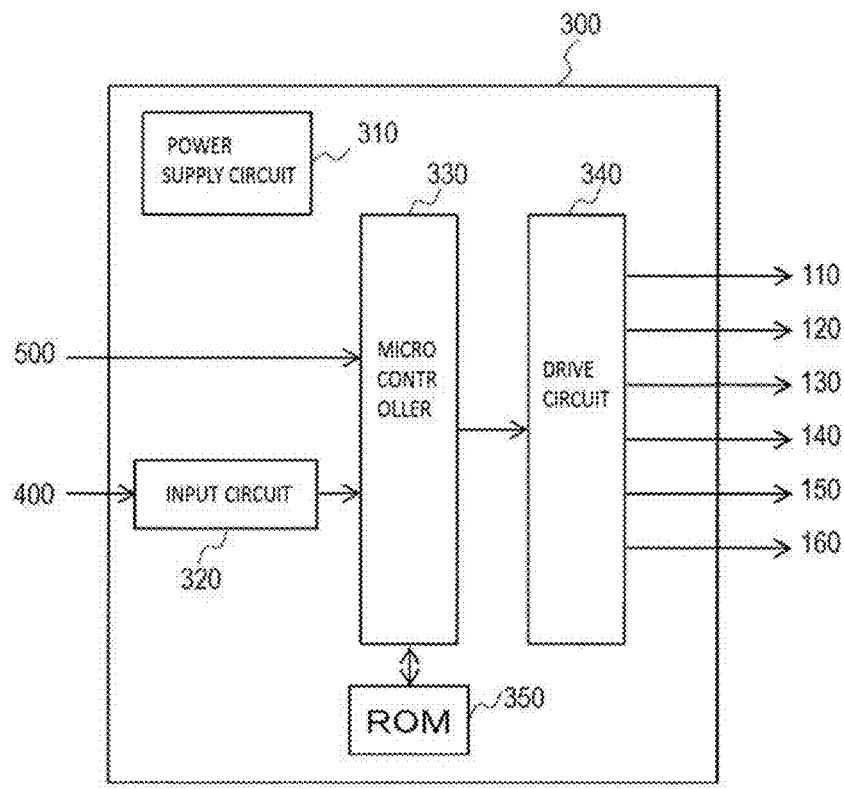
FIG. 4 is a block diagram illustrating a typical block configuration of a control circuit 300.

FIG. 4 illustrates a typical block configuration of the control circuit 300.

The control circuit 300 includes, for example, a power supply circuit 310, an input circuit 320, a microcontroller 330, a drive circuit 340, and a read only memory (ROM) 350. The control circuit 300 is connected to the power conversion device 100. The control circuit 300 drives the motor 200 by controlling the power conversion device 100, specifically, the first inverter 110, the first separation relay circuit 120, the third separation relay circuit 130, the second inverter 140, the second separation relay circuit 150, and the fourth separation relay circuit 160 (see FIG. 1). The control circuit 300 can perform closed loop control by controlling the target motor torque and target rotational speed.

The power supply circuit 310 generates DC voltages (for example, 3V, 5V) necessary for each block in the circuit.

The input circuit 320 receives a motor current value (hereinafter referred to as "actual current value") detected by the current sensor 400. The input circuit 320 converts a level of the actual current value to an input level of the microcontroller 330 as necessary and outputs the actual current value to the microcontroller 330. The input circuit 320 is an analog-digital conversion circuit.

The microcontroller 330 receives a rotation signal of a rotor detected by the angle sensor 500. The microcontroller 330 generates a PWM signal by setting a target current value according to the actual current value, the rotation signal of the rotor, and the like and outputs the generated PWM signal to the drive circuit 340.

For example, the microcontroller 330 generates a PWM signal for controlling a switching operation (turning-on or turning-off) of each switching element in the first and second inverters 110 and 140 of the power conversion device 100. The microcontroller 330 generates a signal that determines the on/off states of each separation relay in each separation relay circuit of the power conversion device 100.

The drive circuit 340 is typically a gate driver. The drive circuit 340 generates, according to the PWM signal, a control signal (e.g., gate control signal) for controlling the switching operation of each switching element in the first and second inverters 110 and 140 and assigns the control signal to each switching element. Furthermore, according to the signal from the microcontroller 330 that determines the on/off states of each separation relay, the drive circuit 340 may generate a control signal (analog signal) for turning each separation relay on or off and assign the control signal to each separation relay. The microcontroller 330 may have a function of the drive circuit 340. In that case, the drive circuit 340 is not required.

The ROM 350 is, for example, a writable memory (e.g., a programmable read-only memory (PROM)), a rewritable memory (e.g., a flash memory), or a read-only memory. The ROM 350 stores a control program including an instruction group for causing the microcontroller 350 to control the power conversion device 100. For example, the control program is deployed temporarily into a random access memory (RAM) (not illustrated) at boot time.

Control of the power conversion device 100 includes control at a normal time and an abnormal time. The control circuit 300 (mainly the microcontroller 330) can switch control of the power conversion device 100 from control at the normal time to control at the abnormal time. The on/off states of each separation relay of the first separation relay circuit 120, the second separation relay circuit 150, the third separation relay circuit 130, and the fourth separation relay circuit 160 are determined according to a failure pattern which will be described below.

Hereinafter, the on/off states of each separation relay circuit and the electrical connection relationships between the first and second inverters 110 and 140 and the first and second coil groups 210 and 220 in the on/off states will be described in detail.

When the first separation relay circuit 120 is turned on and the third separation relay circuit 130 is turned on, the first inverter 110 is connected to the first coil group 210. When the first separation relay circuit 120 is turned on and the fourth separation relay circuit 160 is turned on, the first inverter 110 is connected to the second coil group 220. When the first separation relay circuit 120 is turned off, the first inverter 110 is electrically separated from the first and second coil groups 210 and 220. In the present specification, "turn on the separation relay circuit" means turning on all separation relays in the separation relay circuit, and "turn off the separation relay circuit" means turning off all separation relays in the separation relay circuit.

When the second separation relay circuit 150 is turned on and the third separation relay circuit 130 is turned on, the second inverter 140 is connected to the first coil group 210. When the second separation relay circuit 150 is turned on and the fourth separation relay circuit 160 is turned on, the second inverter 140 is connected to the second coil group 220. When the second separation relay circuit 150 is turned off, the second inverter 140 is electrically separated from the first and second coil groups 210 and 220.

When the third separation relay circuit 130 is turned on and the first separation relay circuit 120 is turned on, the first coil group 210 is connected to the first inverter 110. When the third separation relay circuit 130 is turned on and the second separation relay circuit 150 is turned on, the first coil group 210 is connected to the second inverter 140. When the third separation relay circuit 130 is turned off, the first coil group 210 is electrically separated from the first and second inverters 110 and 140.

When the fourth separation relay circuit 160 is turned on and the first separation relay circuit 120 is turned on, the second coil group 220 is connected to the first inverter 110. When the fourth separation relay circuit 160 is turned on and the second separation relay circuit 150 is turned on, the second coil group 220 is connected to the second inverter 140. When the fourth separation relay circuit 160 is turned off, the second coil group 220 is electrically separated from the first and second inverters 110 and 140.

By turning each separation relay on or off in each separation relay circuit, it is possible to switch, for each phase, the above-described electrical connections between the first and second inverters 110 and 140 and the first and second coil groups 210 and 220.

Hereinafter, a specific example of an operation of the motor drive unit 1000 will be described, and a specific example of an operation of the power conversion device 100 will be mainly described.

First, a specific example of a control method at a normal time of the power conversion device 100 will be described.

In the present specification, "normal" indicates the state in which a failure does not occur in the first inverter 110, the second inverter 140, the first coil group 210, and the second coil group 220. "Abnormal" indicates a state in which a failure occurs in a switching element in a bridge circuit of an inverter and a state in which a failure occurs in a coil of a motor. The failure of a switching element mostly indicates an open failure and a short failure of a semiconductor switching element (FET). "Open failure" refers to a failure in which a portion between a source and a drain of an FET is open (in other words, resistance rds between the source and the drain becomes high impedance), and "short failure" refers to a failure in which the short circuit occurs between the source and the drain of the FET. A failure of a winding is, for example, a break in the winding.

In the control at the normal time, the control circuit 300 (mainly the microcontroller 330) turns on the four separation relay circuits, the first separation relay circuit 120, the second separation relay circuit 150, the third separation relay circuit 130, and the fourth separation relay circuit 160. Due to this control, the first inverter 110 is connected to the first coil group 210 and the second coil group 220, and the second inverter 140 is connected to the first coil group 210 and the second coil group 220.

In the control at the normal time, for example, with respect to the U-phase, the potential difference between the node between the first separation relay 120A and the third separation relay 130A and the node between the second separation relay 150A and the fourth separation relay 160A becomes zero. The potential differences between two nodes with respect to the other two phases also become zero. For that reason, no current flows through the three connection lines. Therefore, substantially, the first inverter 110 is connected to the first coil group 210, and the second inverter 140 is connected to the second coil group 220. In this connection state, it is possible to energize the first coil group 210 using the first inverter 110 and to energize the second coil group 220 using the second inverter 140.

Figure 5:
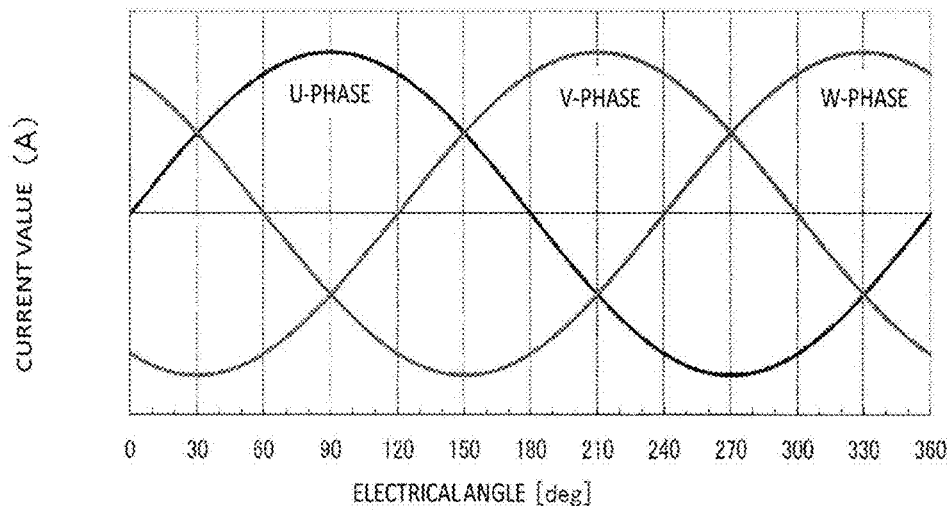
FIG. 5 is a graph showing an example of a current waveform (sine wave) obtained by plotting values of current flowing through U-phase, V-phase, and W-phase windings in each of first and second coil groups 210 and 220.

FIG. 5 shows an example of a current waveform (sine wave) obtained by plotting values of current flowing through the U-phase, V-phase, and W-phase windings in each of the first and second coil groups 210 and 220. The horizontal axis indicates the motor electrical angle (deg), and the vertical axis indicates the current value (A). In the current waveform, the sum of the currents flowing through the three-phase windings is "0" for each motor electrical angle.

The control circuit 300 controls a switching operation of each switching element of the first inverter 110 so that a pseudo sine wave shown in FIG. 5 is obtained. The control circuit 300 also controls a switching operation of each switching element of the second inverter 140 so that the pseudo sine wave shown in FIG. 5 is obtained. In addition to the sine wave shown as an example in FIG. 5, it is possible to drive the motor 200 using, for example, a rectangular wave.

When the power conversion device 100 is used for a long time, a failure may occur in a switching element of each inverter or a winding of the motor 200. These failures are different from a manufacture failure that may occur at the time of manufacturing. When such a failure occurs, the above-described control at the normal time becomes impossible.

As an example of failure detection, the drive circuit 340 detects a failure of a switching element by monitoring a voltage (Vds) between a drain and a source of a switching element (e.g., FET) and comparing the Vds with a predetermined threshold voltage. The threshold voltage is set in the drive circuit 340, for example, by data communication with an external IC (not illustrated) and an external component. The drive circuit 340 is connected to a port of the microcontroller 330 and notifies the microcontroller 330 of a failure detection signal. For example, when the drive circuit 340 detects a failure of a switching element, the drive circuit 340 asserts a failure detection signal. When the microcontroller 330 receives the asserted failure detection signal, the microcontroller 330 reads internal data of the drive circuit 340 to determine which of the plurality of switching elements in the two inverters has failed.

As another example of failure detection, the microcontroller 330 can also detect a failure of a switching element on the basis of a difference between an actual current value and a target current value of a motor. Furthermore, for example, the microcontroller 330 may also detect whether a winding of the motor 200 has a break on the basis of the difference between the actual current value and the target current value. However, failure detection is not limited to these methods, and other known methods related to failure detection can be widely used.

When a failure detection signal is asserted, the microcontroller 330 switches the control of the power conversion device 100 from the control at the normal time to the control at the abnormal time. For example, a timing, at which the control of the power conversion device 100 is switched from the control at the normal time to the control at the abnormal time, is about 10 msec to 30 msec after the failure detection signal is asserted.

Various failure patterns exist in the failure of the power conversion device 100. Hereinafter, typical failure patterns will be listed, and a control method of each separation relay in each separation relay circuit will be described for each failure pattern.

Figure 6:
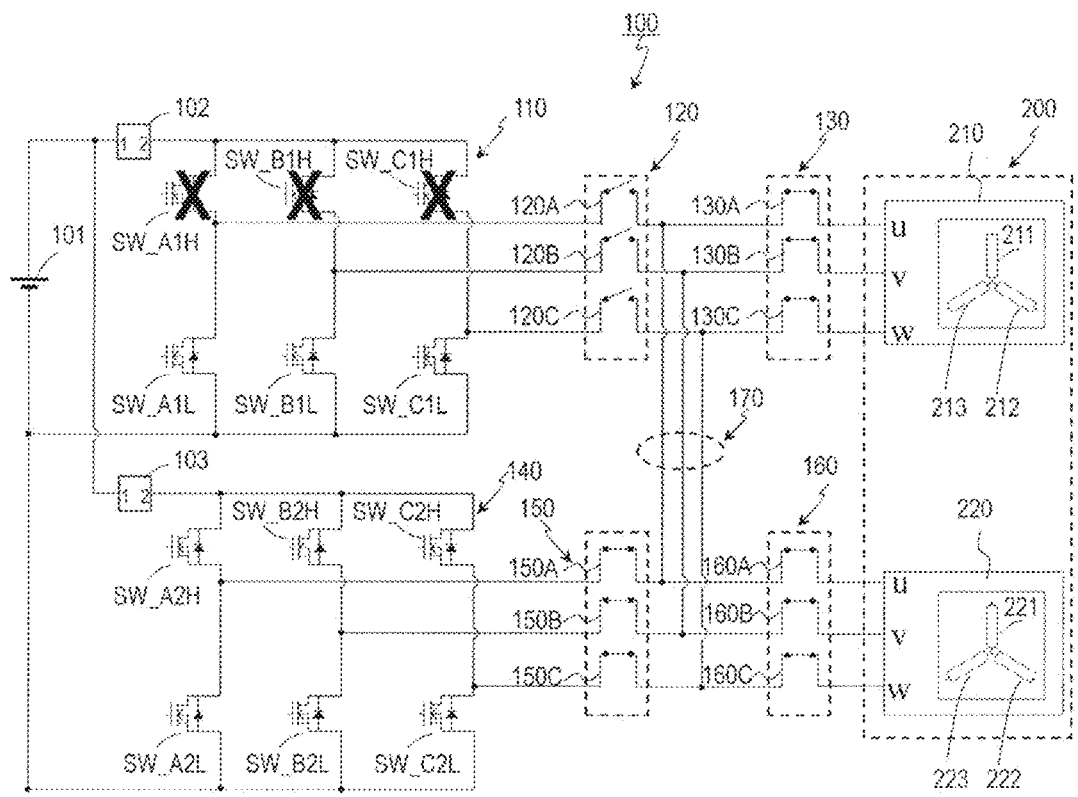
FIG. 6 is a view exemplifying a condition of a failure of a switching element in a bridge circuit according to failure pattern 1.

FIG. 6 exemplifies a condition of a failure of a switching element in a bridge circuit according to failure pattern 1.

For example, it is assumed that all the high side switching elements SW_A1H, SW_B1H, and SW_C1H have failed in one of the two inverters (first inverter 110). In that case, the control circuit 300 turns off the first separation relay circuit 120 and turns on the second separation relay circuit 150, the third separation relay circuit 130, and the fourth separation relay circuit 160. Consequently, the failed first inverter 110 is electrically separated from the motor 200. Naturally, in a case in which the second inverter 140 fails, the same control as described above is established.

For example, in the motor drive device of the related art, by opening the power supply relay of the failed inverter, the supply of current to the winding set connected to the failed inverter is suddenly cut off. In that case, there is a risk that an unintended large current may flow to the motor 200 according to a magnitude relation between voltages of the three-phase windings. Consequently, brake torque may occur.

According to the above-described control method, even when the first inverter 110 includes a failed leg in at least one of the three phases, it is possible to suppress the occurrence of brake torque because power is continuously supplied from the second inverter 140 to the first coil group 210 via the connection line 170. Even when a failure occurs, it is possible to continuously drive the motor drive unit 1000.

For example, in the motor drive device of the related art, when attempting to maintain the motor torque when both of the systems are normal even at the time of failure, it is necessary to flow twice the current in the winding set connected to the system which has not failed. As a result, for example, a problem arises in that copper loss of the entire motor increases. On the other hand, according to the present example embodiment, by branching the current from the second inverter 140 via the connection line 170, the first and second coil groups 210 and 220 can be energized. For that reason, it becomes possible to suppress an increase in copper loss of the motor 200.

Figure 7:
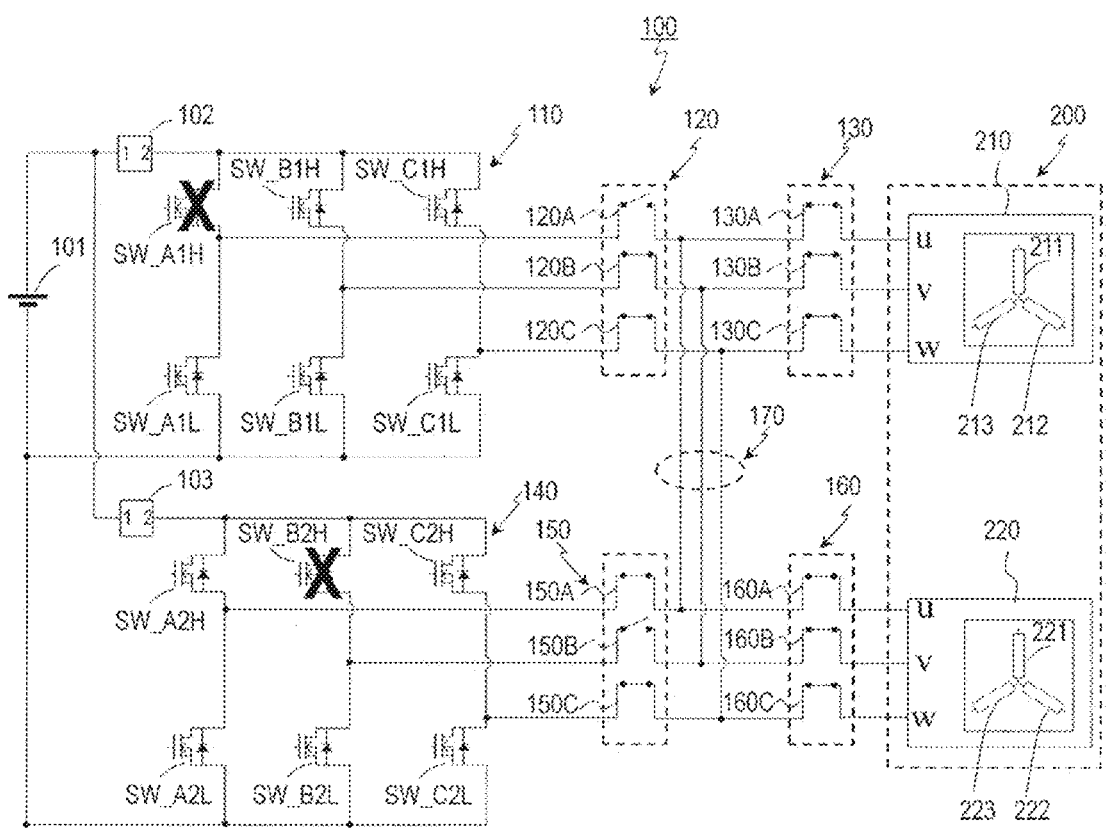
FIG. 7 is a view exemplifying a condition of a failure of a switching element in a bridge circuit according to failure pattern 2.

FIG. 7 exemplifies a condition of a failure of a switching element in a bridge circuit according to failure pattern 2.

For example, it is assumed that the high side switching element SW_A1H of the U-phase leg of the first inverter 110 and the high side switching element SW_B2H of the V-phase leg of the second inverter 140 have simultaneously failed. In that case, the control circuit 300 turns off the first separation relay 120A connected to the leg including the failed high side switching element SW_A1H among the three first separation relays, turns on the other two first separation relays 120B and 120C, turns off the second separation relay 150B connected to the leg including the failed high side switching element SW_B2H among the three second separation relays, turns on the other two second separation relays 150A and 150C, and turns on the third and fourth separation relay circuits 130 and 160. Due to this control, it becomes possible to continue supplying power to the first and second coil groups 210 and 220 using the legs of the first and second inverters 110 and 140 that have not failed. In the failed U-phase and V-phase, because the current branches from an inverter among the two inverters which has not failed to the two coil groups via the connection line 170, although the torque decreases, it is possible to continue driving the motor drive unit 1000.

According to the above-described control method, even when, in one of the two inverters, a switching element of one of the three phases fails and, in the other inverter, a switching element of one phase different from the failed phase further fails, it is possible to continue driving the motor drive unit 1000. In a case in which the failure pattern 2 occurs in the related art, the motor drive device has to be stopped because no current flows in windings of two of the three phases. In this manner, it can be said that the related art does not have resistance to two failures that simultaneously occur in two inverters. On the other hand, as described above, the power conversion device according to the present disclosure has such resistance.

Figure 8:
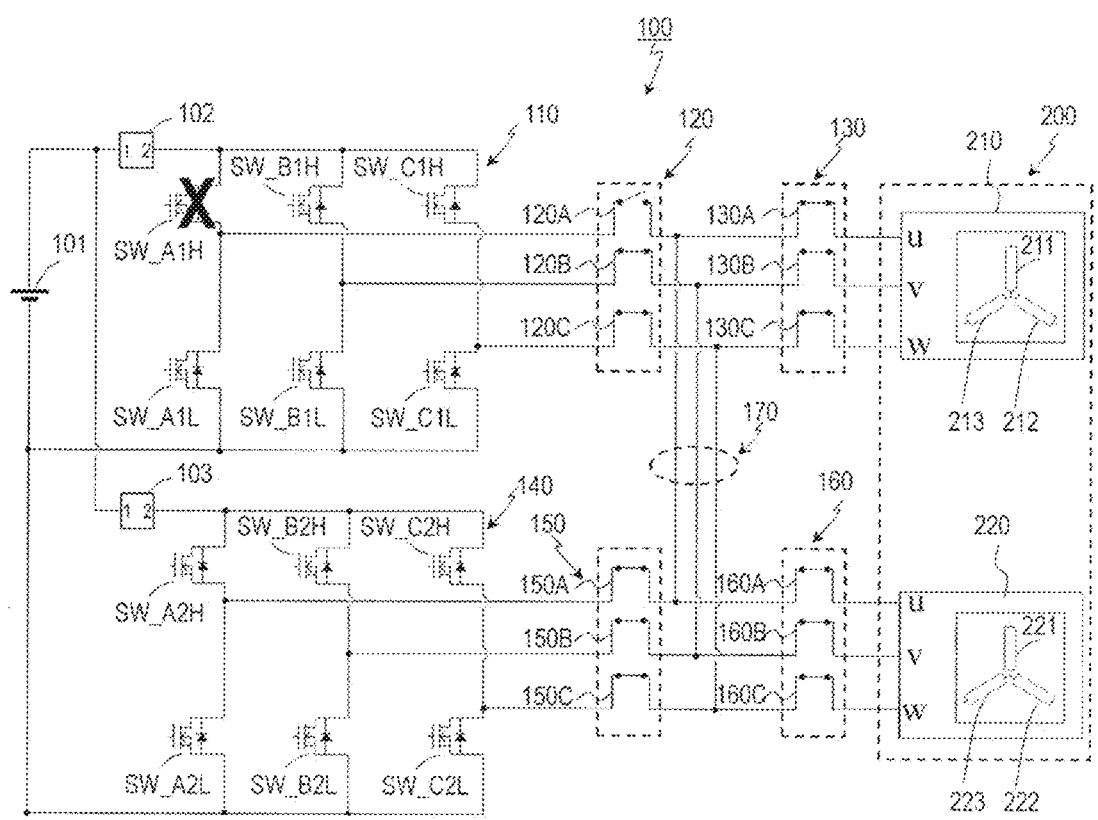
FIG. 8 is a view exemplifying a condition of a failure of a switching element in a bridge circuit according to failure pattern 3.

FIG. 8 exemplifies a condition of a failure of a switching element in a bridge circuit according to failure pattern 3.

For example, it is assumed that the high side switching element SW_A1H of the U-phase leg of the first inverter 110 has failed. In that case, the control circuit 300 turns off the first separation relay 120A connected to the leg including the failed high side switching element SW_A1H among the three first separation relays, turns on the other two first separation relays 120B and 120C, and turns on the second separation relay circuit 150, the third separation relay circuit 130, and the fourth separation relay circuit 160. Due to this control, it becomes possible to continue supplying power to the first and second coil groups 210 and 220 using the two legs of the first inverter 110 that have not failed and the second inverter 140.

According to the above-described control method, even in a case in which one bridge circuit of the two inverters includes a failed switching element in a leg of one of the three phases, it is possible to continue driving the motor drive unit 1000.

Figure 9A:
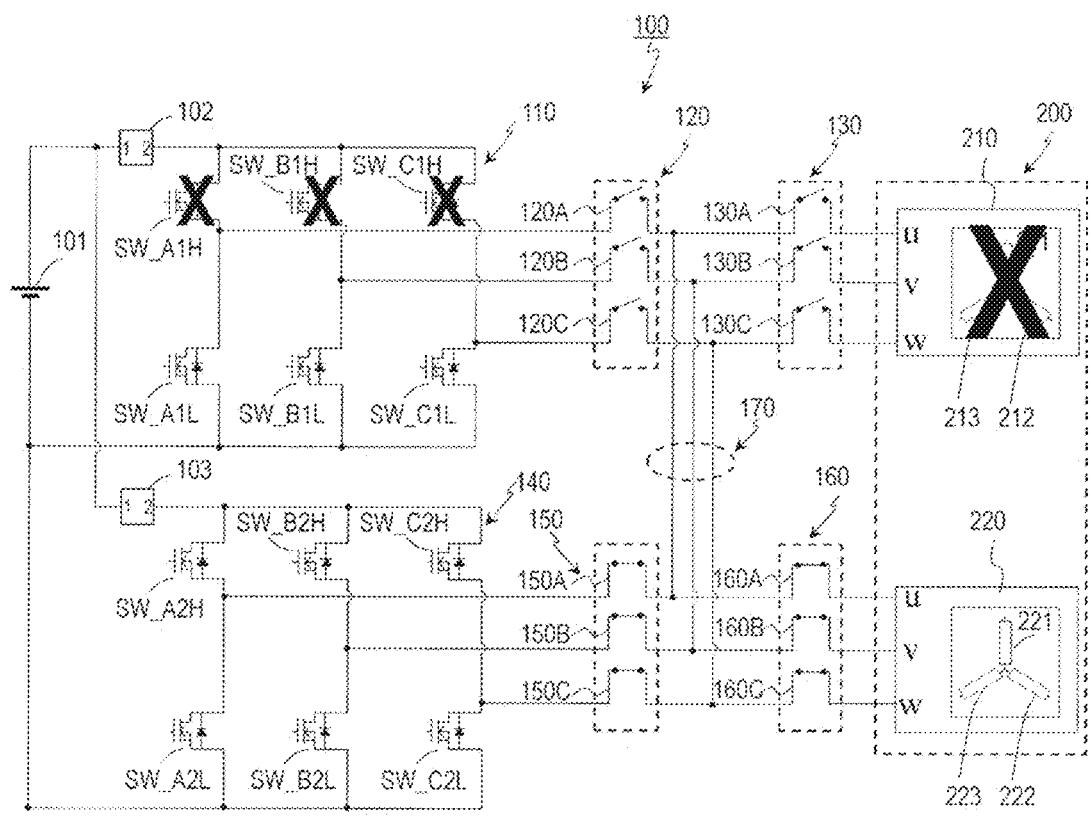
FIG. 9A is a view exemplifying a condition of a failure of a switching element in a bridge circuit according to failure pattern 4.

FIG. 9A exemplifies a condition of a failure of a switching element in a bridge circuit according to failure pattern 4.

For example, it is assumed that, in one of the two inverters (first inverter 110), all the high side switching elements SW_A1H, SW_B1H, and SW_C1H have failed, and the first coil group 210, e.g., all of the three-phase windings, have failed simultaneously. In that case, the control circuit 300 turns off the first and third separation relay circuits 120 and 130 and turns on the second and fourth separation relay circuits 150 and 160. Due to this control, it is possible to connect the second inverter 140, which has not failed, and the second coil group 220, which has not failed. It becomes possible to continue supplying power to the second coil group 220 using the second inverter 140.

Figure 9B:
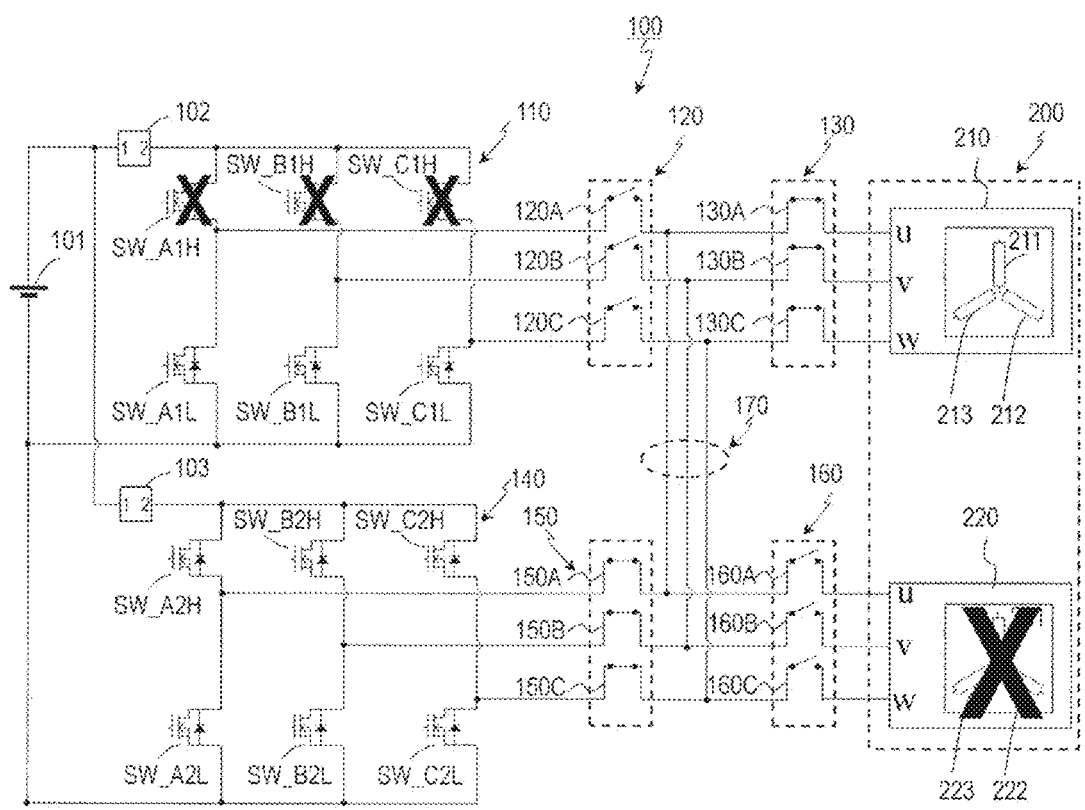
FIG. 9B is a view exemplifying another condition of the failure of the switching element in the bridge circuit according to failure pattern 4.

FIG. 9B exemplifies another condition of the failure of the switching element in the bridge circuit according to failure pattern 4.

For example, it is assumed that, in one of the two inverters (first inverter 110), all the high side switching elements SW_A1H, SW_B1H, and SW_C1H have failed, and the second coil group 220, e.g., all of the three-phase windings, have failed simultaneously. In that case, the control circuit 300 turns off the first and fourth separation relay circuits 120 and 160 and turns on the second separation relay circuit 150 and the third separation relay circuit 130. Due to this control, it is possible to connect the second inverter 140, which has not failed, and the first coil group 210, which has not failed. It becomes possible to continue supplying power to the first coil group 210 using the second inverter 140.

According to the above-described control method, even in a case in which one bridge circuit of the two inverters and one of the two coil groups have failed simultaneously, it is possible to continue driving the motor drive unit 1000. In a case in which the failure pattern 4 illustrated in FIG. 9B occurs in the related art, the motor drive device has to be stopped because power is not supplied to either of the two winding sets.

Figure 10:
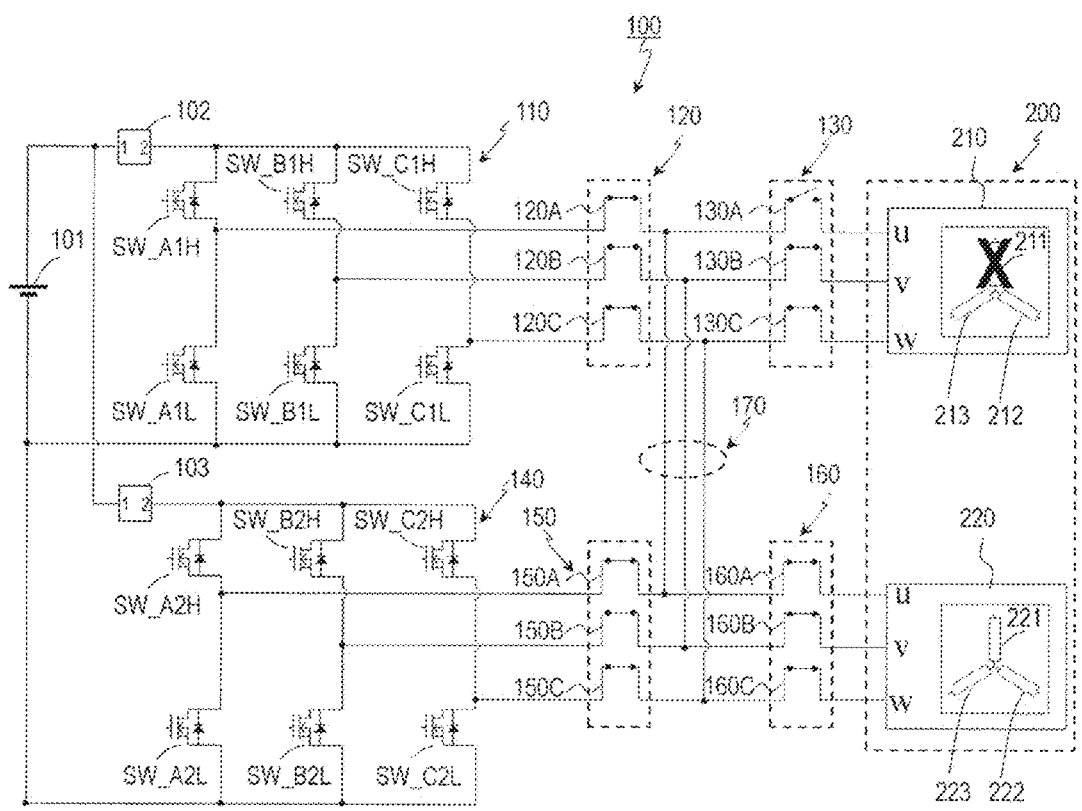
FIG. 10 is a view exemplifying a condition of a failure of a switching element in a bridge circuit according to failure pattern 5.

FIG. 10 exemplifies a condition of a failure of a switching element in a bridge circuit according to failure pattern 5.

For example, it is assumed that the U-phase winding 211 of the three-phase windings 211, 212, and 213 of the first coil group 210 has a break. In that case, the control circuit 300 turns off the third separation relay 130A connected to the failed winding 211 among the three third separation relays, turns on the other two third separation relays 130B and 130C, and turns on the first, second, and fourth separation relay circuits 120, 150, and 160. Due to this control, it becomes possible to continue supplying power to the second coil group 220 and the V-phase and W-phase windings 212 and 213, which have not failed, of the first coil group 210 by using the first and second inverters 110 and 140.

According to the above-described control method, even when a winding of one phase among the three-phase windings of one of the two coil groups has failed, it is possible to continue driving the motor drive unit 1000.

Figure 11:
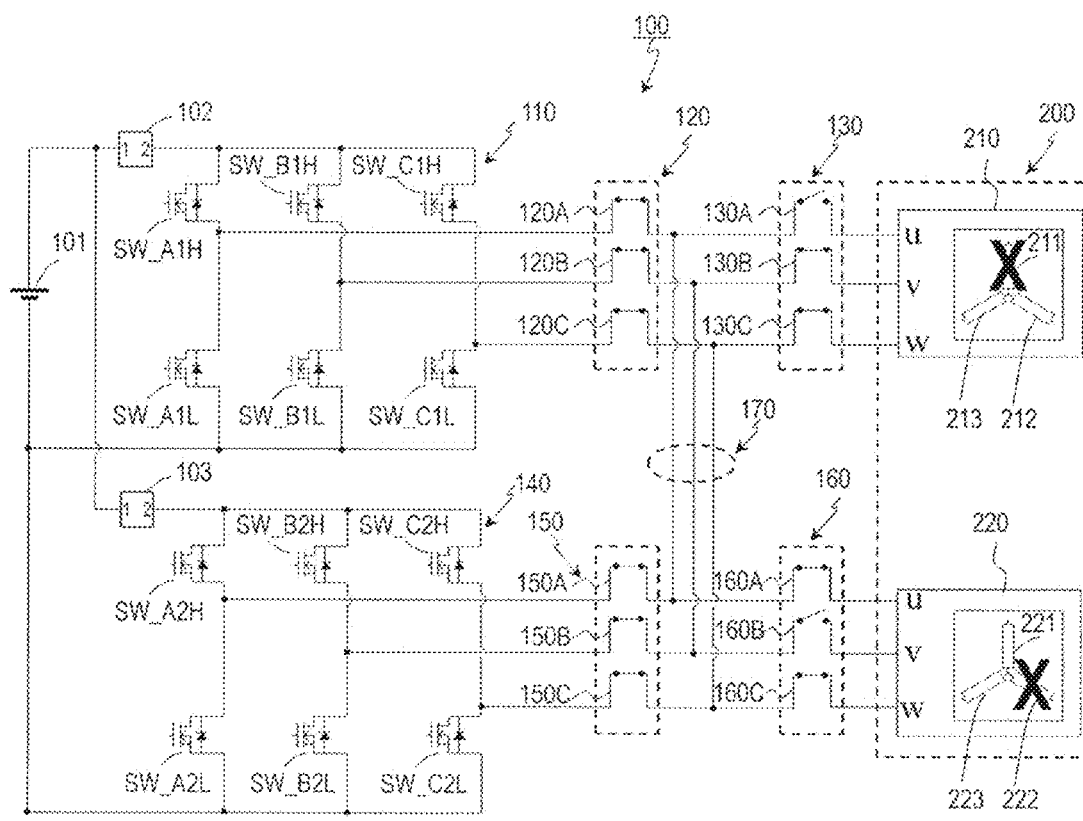
FIG. 11 is a view exemplifying a condition of a failure of a switching element in a bridge circuit according to failure pattern 6.

FIG. 11 exemplifies a condition of a failure of a switching element in a bridge circuit according to failure pattern 6.

For example, it is assumed that the U-phase winding 211 of the three-phase windings 211, 212, and 213 of the first coil group 210 has failed, and the V-phase winding 222 of the three-phase windings 221, 222, and 223 of the second coil group 220 has failed simultaneously. In that case, the control circuit 300 turns off the third separation relay 130A connected to the failed winding 211 among the three third separation relays, turns on the other two third separation relays 130B and 130C, turns off the fourth separation relay 160B connected to the failed winding 222 among the three fourth separation relays, turns on the other two fourth separation relays 160A and 160C, and turns on the first and second separation relay circuits 120 and 150. Due to this control, it becomes possible to continue supplying power to the V-phase and W-phase windings 212 and 213, which have not failed, of the first coil group 210 and the U-phase and W-phase windings 221 and 223, which have not failed, of the second coil group 220 by using the first and second inverters 110 and 140.

According to the above-described control method, even when a winding of one phase among the three-phase windings of the first coil group fails and a winding of one phase different from the failed phase among the three-phase windings of the second coil group fails, it is possible to continue driving the motor drive unit 1000.

A power conversion device 100A according to the present example embodiment is different from the power conversion device 100 according to the first example embodiment in that the power conversion device 100A further includes a third inverter 180 connected to the connection line 170. Hereinafter, differences from the power conversion device 100 according to the first example embodiment will be mainly described.

Figure 12:
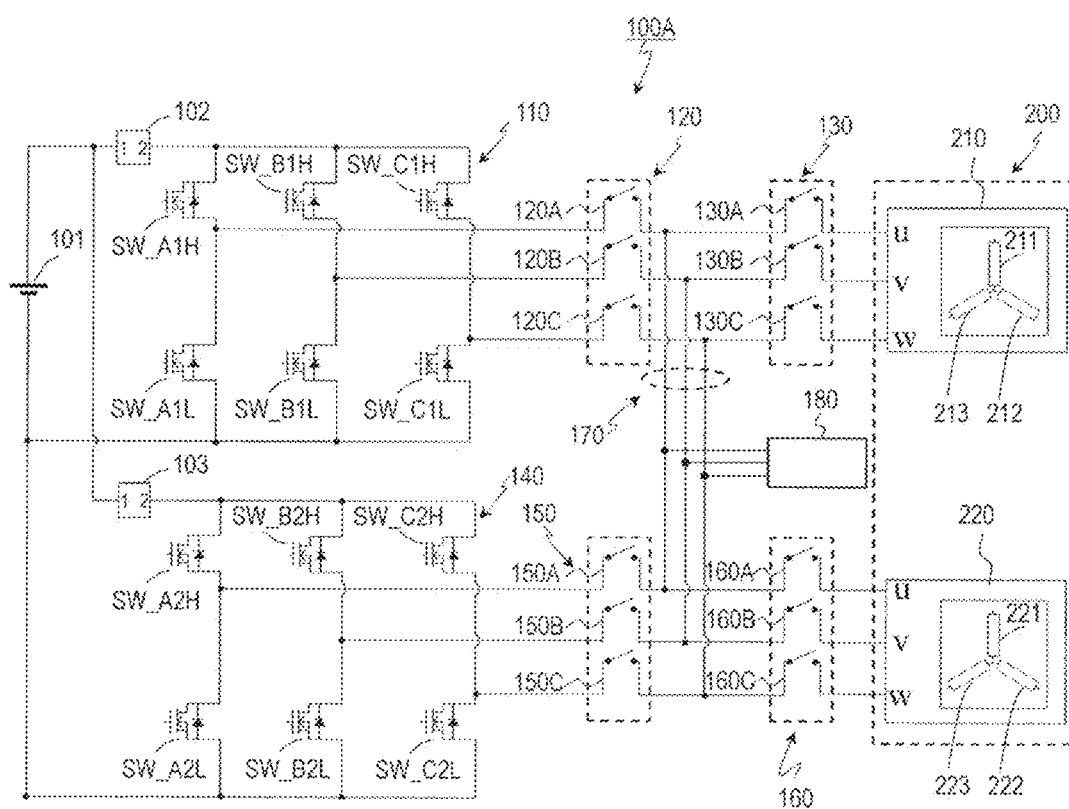
FIG. 12 is a circuit diagram illustrating a typical circuit configuration of a power conversion device 100A according to a second example embodiment of the present disclosure.

FIG. 12 schematically illustrates a typical circuit configuration of the power conversion device 100A according to the present example embodiment.

The power conversion device 100A further includes the third inverter 180. The third inverter 180 includes the same structure as the first and second inverters 110 and 140. The third inverter 180 is connected to three connection lines. The third inverter 180 is connectable to the first and second coil groups 210 and 220 via the three connection lines 170.

According to the present example embodiment, even in a case in which the first inverter 110 or the second inverter 140 has failed, by using the third inverter 180 in place of the failed inverter, it is possible to continue driving the motor without causing torque to decrease.

Figure 13:
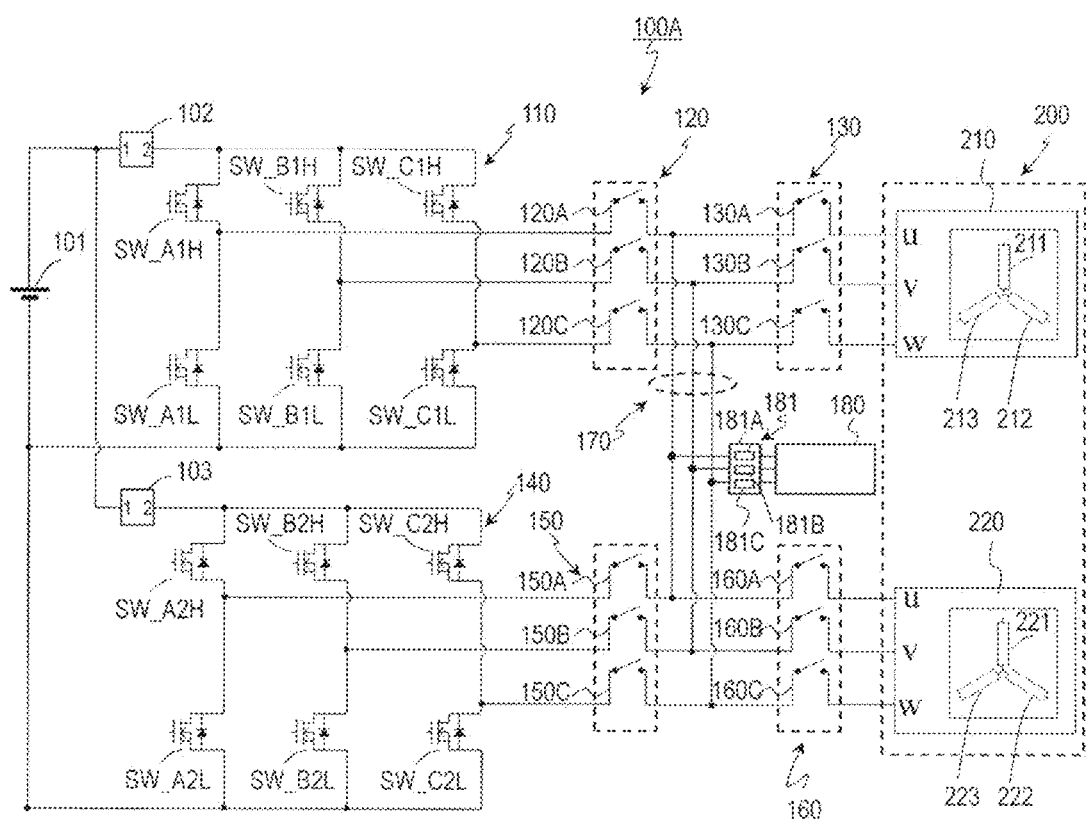
FIG. 13 is a circuit diagram illustrating another circuit configuration of the power conversion device 100A according to the second example embodiment of the present disclosure.

FIG. 13 schematically illustrates another circuit configuration of the power conversion device 100A according to the present example embodiment.

The power conversion device 100A further includes a fifth separation relay circuit 181 in addition to the third inverter 180.

The fifth separation relay circuit 181 includes three fifth separation relays that, for each phase, switch between connection and disconnection between the third inverter 180 and the connection line 170. Specifically, a U-phase leg of the third inverter 180 is connected to the U-phase connection line 170 via a fifth separation relay 181A. A V-phase leg of the third inverter 180 is connected to the V-phase connection line 170 via a fifth separation relay 181B. A W-phase leg of the third inverter 180 is connected to the W-phase connection line 170 via a fifth separation relay 181C.

A power conversion device 100B according to the present example embodiment is different from the power conversion device 100 according to the first example embodiment in that the power conversion device 100B further includes a sixth separation relay circuit 190 arranged on the three connection lines 170. Hereinafter, differences from the power conversion device 100 according to the first example embodiment will be mainly described.

Figure 14:
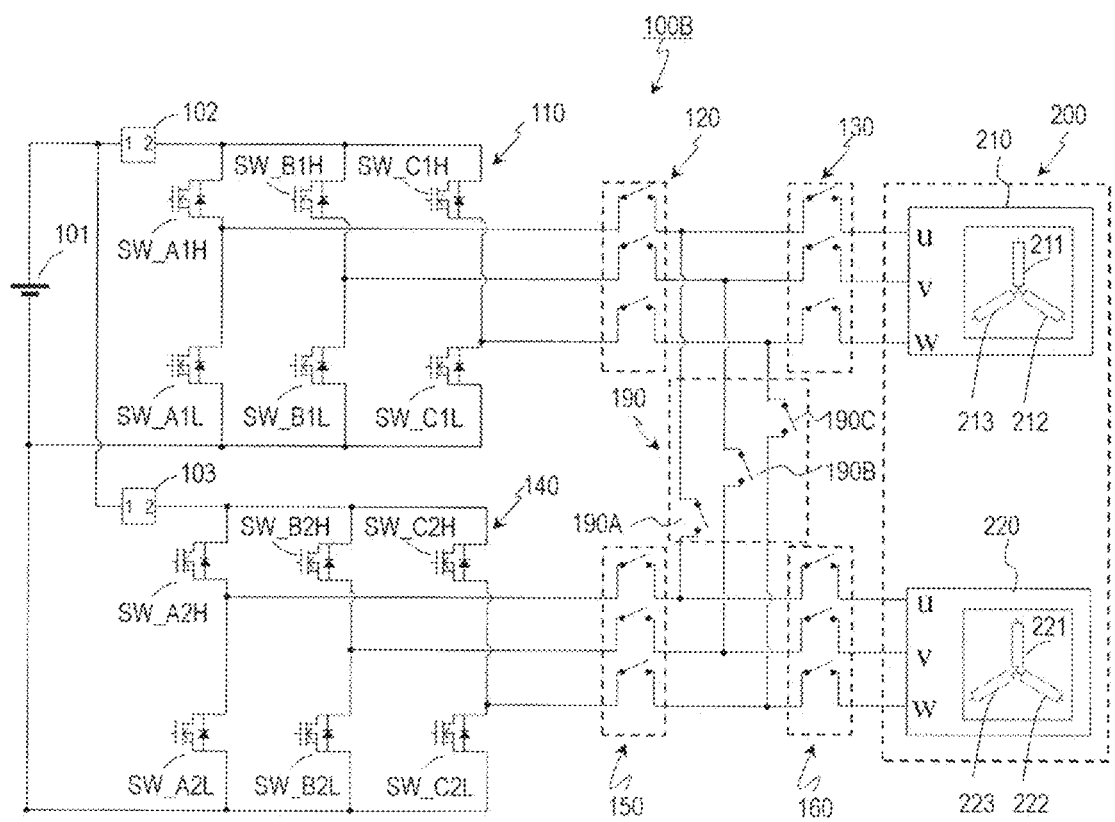
FIG. 14 is a circuit diagram illustrating a typical circuit configuration of a power conversion device 100B according to a third example embodiment of the present disclosure.

FIG. 14 schematically illustrates a typical circuit configuration of the power conversion device 100B according to the present example embodiment.

The power conversion device 100B further includes the sixth separation relay circuit 190 arranged on the three connection lines 170.

The sixth separation relay circuit 190 includes three sixth separation relays that, for each phase, switch between connection and disconnection between three nodes. For each phase, the sixth separation relay circuit 190 switches between connection and disconnection between three nodes between the first and third separation relay circuits 120 and 130 and between three nodes between the second and fourth separation relay circuits 150 and 160.

A sixth separation relay 190A switches between connection and disconnection between the U-phase nodes. A sixth separation relay 190B switches between connection and disconnection between the V-phase nodes. A sixth separation relay 190C switches between connection and disconnection between W-phase nodes. Each of the sixth separation relays 190A, 190B, and 190C is a bidirectional switch.

According to the present example embodiment, as compared with the circuit configuration according to the first example embodiment, it becomes possible to more appropriately control the current flowing through the connection line 170.

Figure 15:
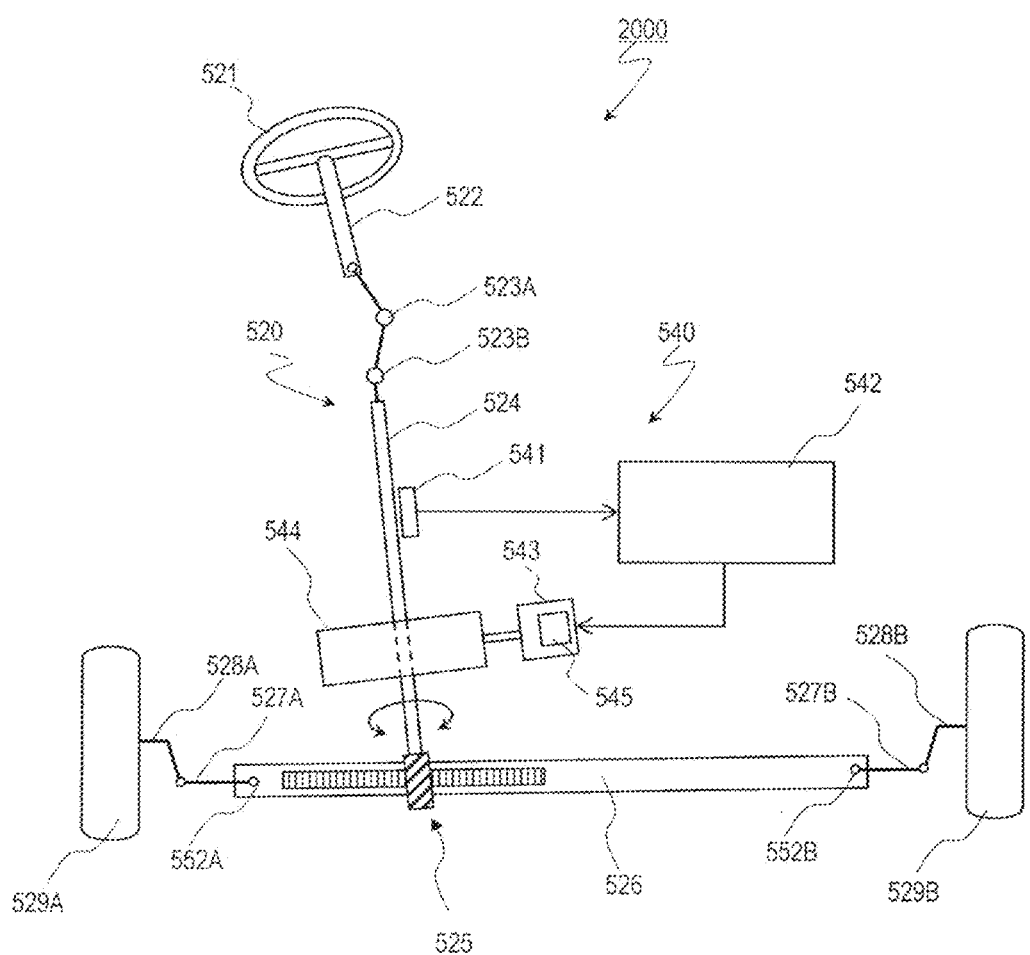
FIG. 15 is a schematic diagram illustrating a typical configuration of an electric power steering device according to a fourth example embodiment of the present disclosure.

FIG. 15 schematically illustrates a typical configuration of an electric power steering device 2000 according to the present example embodiment.

Generally, vehicles such as automobiles have an electric power steering (EPS) device. The electric power steering device 2000 according to the present example embodiment includes a steering system 520 and an auxiliary torque mechanism 540 that generates auxiliary torque. The electric power steering device 2000 generates auxiliary torque for assisting steering torque of a steering system that is generated by a driver operating a steering wheel. The auxiliary torque reduces the burden on an operation of the driver.

The steering system 520 may be configured by, for example, a steering wheel 521, a steering shaft 522, universal couplings 523A and 523B, a rotation shaft 524, a rack and pinion mechanism 525, a rack shaft 526, left and right ball joints 552A and 552B, tie rods 527A and 527B, knuckles 528A and 528B, and left and right steering vehicle wheels 529A and 529B.

The auxiliary torque mechanism 540 may be configured by, for example, a steering torque sensor 541, an automotive electronic control unit (ECU) 542, a motor 543, a deceleration mechanism 544, and the like. The steering torque sensor 541 detects the steering torque in the steering system 520. The ECU 542 generates a drive signal on the basis of a detection signal from the steering torque sensor 541. The motor 543 generates auxiliary torque according to the steering torque on the basis of the drive signal. The motor 543 transmits the generated auxiliary torque to the steering system 520 via the deceleration mechanism 544.

The ECU 542 includes, for example, the microcontroller 330, the drive circuit 340, and the like according to the first example embodiment. In an automobile, an electronic control system is built around the ECU. In the electric power steering device 2000, a motor drive unit is built by, for example, the ECU 542, the motor 543, and an inverter 545. The motor drive unit 1000 according to the first example embodiment can be suitably used for the system.

The example embodiments of the present disclosure are also suitably used for motor control systems including X-by-wire such as shift-by-wire, steering-by-wire, and brake-by-wire and traction motors. For example, the motor control system according to the example embodiments of the present disclosure can be mounted on an autonomous vehicle corresponding to levels 0 to 4 (standards of automation) defined by the Japanese government and the National Highway Traffic Safety Administration (NHTSA).

According to an example embodiment of the present disclosure, there is provided a power conversion device capable of appropriately performing motor driving according to a failure pattern by first to fourth separation relay circuits and connection lines, a motor drive unit including the power conversion device, and an electric power steering device including the motor drive unit.

The example embodiments of the present disclosure can be widely used in various devices including various motors, such as a vacuum cleaner, a dryer, a ceiling fan, a washing machine, a refrigerator, and an electric power steering device.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power conversion device converting power from a power supply to power supplied to an n-phase motor including a first coil group and a second coil group, where n is an integer of 3 or more, the power conversion device comprising:
   a first inverter connectable to at least one of the first and second coil groups;
   a second inverter connectable to at least one of the first and second coil groups;
   a first separation relay circuit connected to the first inverter to, for each phase, switch on/off between the first inverter and the first and second coil groups;
   a second separation relay circuit connected to the second inverter to, for each phase, switch on/off between the second inverter and the first and second coil groups;
   a third separation relay circuit connected between the first separation relay circuit and the first coil group to, for each phase, switch on/off between the first and second inverters and the first coil group;
   a fourth separation relay circuit connected between the second separation relay circuit and the second coil group to, for each phase, switch on/off between the first and second inverters and the second coil group; and
   n connection lines to, for each phase, connect n nodes between the first and third separation relay circuits and n nodes between the second and fourth separation relay circuits.

2. The power conversion device according to claim 1, wherein:
   the first separation relay circuit includes n first separation relays to, for each phase, switch on/off between the first inverter and the first and second coil groups;
   the second separation relay circuit includes n second separation relays to, for each phase, switch on/off between the second inverter and the first and second coil groups;
   the third separation relay circuit includes n third separation relays to, for each phase, switch on/off between the first and second inverters and the first coil group; and
   the fourth separation relay circuit includes n fourth separation relays to, for each phase, switch on/off between the first and second inverters and the second coil group.

3. The power conversion device according to claim 2, wherein each of the n first separation relays and the n second separation relays is a bidirectional switch, and each of the n third separation relays and the n fourth separation relays is a unidirectional switch.

4. The power conversion device according to claim 1, further comprising a first fuse connected between the power supply and the first inverter and a second fuse connected between the power supply and the second inverter.

5. The power conversion device according to claim 1, further comprising a third inverter connected to the n connection lines and connectable to at least one of the first and second coil groups.

6. The power conversion device according to claim 5, further comprising a fifth separation relay circuit to, for each phase, switch on/off between the n connection lines and the third inverter.

7. The power conversion device according to claim 6, wherein the fifth separation relay circuit includes n fifth separation relays to, for each phase, switch on/off between the third inverter and the n connection lines.

8. The power conversion device according to claim 1, further comprising a sixth separation relay circuit provided on the n connection lines to, for each phase, switch on/off between the n nodes between the first and third separation relay circuits and the n nodes between the second and fourth separation relay circuits.

9. The power conversion device according to claim 8, wherein the sixth separation relay circuit includes n sixth separation relays to, for each phase, switch on/off between the n nodes between the first and third separation relay circuits and the n nodes between the second and fourth separation relay circuits.

10. The power conversion device according to claim 9, wherein each of the n sixth separation relays is a bidirectional switch.

11. The power conversion device according to claim 1, wherein, in a case in which the first inverter fails, the first separation relay circuit is turned off, and the second, third, and fourth separation relay circuits are turned on.

12. The power conversion device according to claim 2, wherein
   each bridge circuit of the first and second inverters includes n legs each including a high side switching element and a low side switching element; and
   in a case in which the bridge circuit of the first inverter includes a failed switching element in a leg of one of n phases and the bridge circuit of the second inverter includes a failed switching element in a leg of a different phase of the n phases:
   among the n first separation relays, a first separation relay connected to a leg including the failed switching element is turned off, and the other (n−1) first separation relays are turned on;
   among the n second separation relays, a second separation relay connected to a leg including the failed switching element is turned off, and the other (n−1) second separation relays are turned on; and
   the third and fourth separation relay circuits are turned on.

13. The power conversion device according to claim 2, wherein
   each bridge circuit of the first and second inverters includes n legs each including a high side switching element and a low side switching element; and
   in a case in which the bridge circuit of the first inverter includes a failed switching element in a leg of one of n phases, among the n first separation relays, a first separation relay connected to a leg including failed switching element is turned off, the other (n−1) first separation relays are turned on, and the second, third, and fourth separation relay circuits are turned on.

14. The power conversion device according to claim 1, wherein, in a case in which the first inverter and the first coil group have failed, the first and third separation relay circuits are turned off, and the second and fourth separation relay circuits are turned on.

15. The power conversion device according to claim 1, wherein, in a case in which the first inverter and the second coil group have failed, the first and fourth separation relay circuits are turned off, and the second and third separation relay circuits are turned on.

16. The power conversion device according to claim 2, wherein, in a case in which a coil of one phase among n-phase coils in the first coil group has failed, among the n third separation relays, a third separation relay connected to the failed coil is turned off, the other (n−1) third separation relays are turned on, and the first, second, and fourth separation relay circuits are turned on.

17. The power conversion device according to claim 2, wherein, in a case in which a coil of one phase among n-phase coils in the first coil group has failed and a coil of a phase different from the one phase among the n-phase coils in the second coil group has failed:
among the n third separation relays, a third separation relay connected to the failed coil is turned off, and the other (n−1) third separation relays are turned on;
among the n fourth separation relays, a fourth separation relay connected to the failed coil is turned off, and the other (n−1) fourth separation relays are turned on; and
the first and second separation relay circuits are turned on.

18. A motor drive unit comprising:
the power conversion device according to claim 1; and
a control circuit to control the power conversion device.

19. An electric power steering device comprising the motor drive unit according to claim 18.

* * * * *